United States Patent [19]

Blackburn

[11] 4,439,634
[45] Mar. 27, 1984

[54] CARRIER SUBSCRIBER TELEPHONE OFF-HOOK DETECTOR

[75] Inventor: Tom L. Blackburn, San Jose, Calif.

[73] Assignee: GTE Automatic Electric Incorporated, Northlake, Ill.

[21] Appl. No.: 364,820

[22] Filed: Apr. 2, 1982

[51] Int. Cl.³ .............................................. H04M 3/22
[52] U.S. Cl. ................................. 179/2.51; 179/84 R; 179/16 AA
[58] Field of Search ............... 179/2.51, 18 F, 18 FA, 179/16 AA, 84 R

[56] References Cited

U.S. PATENT DOCUMENTS

| | | | |
|---|---|---|---|
| 3,501,591 | 3/1970 | Krasin et al. | 179/2.5 |
| 3,886,321 | 5/1975 | Krasin et al. | 179/84 R |
| 3,927,266 | 12/1975 | Stewart et al. | 179/2.5 R |
| 3,953,682 | 4/1976 | Daniels et al. | 179/18 FA |
| 4,099,032 | 7/1978 | Roge et al. | 179/18 FA |
| 4,158,752 | 6/1979 | Stewart | 179/2.5 R |
| 4,360,709 | 11/1982 | Hamazato et al. | 179/18 FA |

OTHER PUBLICATIONS

IBM Technical Disclosure Bulletin, vol. 13, No. 9, Feb. 1971, p. 2686, P. Hernandez, "Telephone Subscriber's Loop Current Detector".

Primary Examiner—G. Z. Rubinson
Assistant Examiner—W. J. Brady
Attorney, Agent, or Firm—Russell A. Cannon

[57] ABSTRACT

A resistor and diode means are electrically connected in series between nodes A and B on the base electrodes of first and second transistors of a differential amplifier. These nodes A & B are also connected to a source of temperature-compensated load-sensitive reference voltage and to a tap point, respectively, that senses current in the loop of a carrier-serviced subscriber's telephone set. The base and emitter of a control transistor are also connected to associated nodes A and B. Conduction of the diode means and control transistor prebiases the latter and reduces the reference voltage during an on-hook condition. When the handset goes off-hook, the node B voltage rises faster than that on node A for decreasing the conduction rate of the control transistor to indicate an off-hook condition, and eventually cutting off the control transistor prior to the diode means. This operation of the diode means extends the loop length over which the circuit will detect an off-hook condition. With the diode means cut off, the second transistors collector voltage biases an FET in the loop for varying the resistance thereof and making the loop current a prescribed value for loop lengths that are less than a limiting value.

28 Claims, 1 Drawing Figure

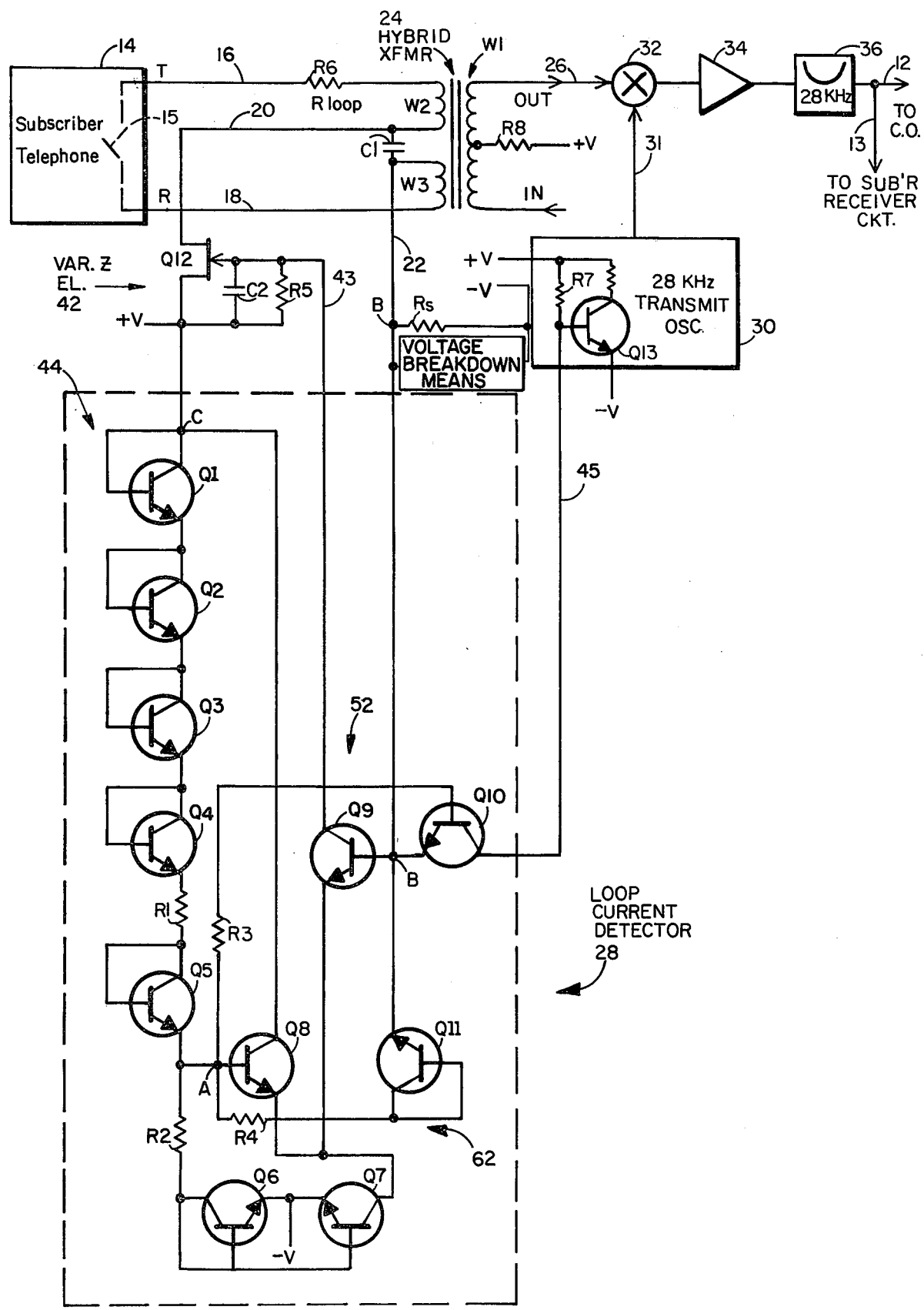

CARRIER SUBSCRIBER TELEPHONE OFF-HOOK DETECTOR

BACKGROUND OF INVENTION

This invention relates to an integratable loop current detector circuit for indicating an off-hook condition of a carrier-serviced subscriber telephone.

Carrier telephone subscriber station terminal equipment is described in the U.S. Pat. Nos. 3,927,266, issued Dec. 16, 1975, Ringer Power Generator Circuit for Subscriber Carrier Station Terminal, by James A. Stewart and Neale A. Zellmer; 4,158,752, issued June 19, 1979, Carrier Subscriber Telephone Station Terminal Loop Current Booster, by James A. Stewart; 3,886,321, issued May 27, 1975, Ringer Generator for Telephone Station Terminal, by Lester Q. Krasin et al.; and 3,501,591, issued Mar. 17, 1970, Subscriber Carrier for Special Service Applications, by Lester Q. Krasin et al.

A carrier station terminal generally comprises a local battery for powering the carrier subscriber's telephone set and electrical circuitry including a transmit oscillator operating at a fixed frequency such as 28 KHz for producing a carrier developed telephone channel there. Active elements of the transmit oscillator are preferrably cut off when the subscribers handset is on-hook for conserving power in the local battery. In ones of these prior art references, an off-hook condition of the handset causes local battery current in the local subscriber loop to be sensed in a base bias resistor of a control transistor for directly turning the latter on or off. This change in the operating state of the control transistor turns on the transmit oscillator for sending a 28 KHz signal to the central office for indicating that the carrier subscriber's handset is off-hook. Such a loop current detector has limited sensitivity in that the loop current to turn the control transistor on or off must be above a minimum valve dictated by the $V_{be}$ of the control transistor. Also, with such a local-loop current detector there is a variable local-loop current, i.e., the local loop current there is a function of the loop resistance which is a function of the length of the subscriber's drop circuit. This may result in excessive loop current being drawn from the local battery and an unnecessarily heavy drain on the local battery for a short drop circuit between the carrier subscriber terminal equipment and the carrier subscriber's telephone. In another loop current detector for supplying a regulated loop current to the carrier subscriber's telephone, the series combination of a base bias resistor and first and second diodes is electrically connected in parallel with the series combination of a regulating or source transistor's collector-emitter path and an emitter resistor, both series strings being electrically connected across the local battery in the subscriber's local loop circuit. The junction of the base bias resistor and one diode is connected to the base electrodes of the source transistor and a control transistor that is nonconducting with the handset on-hook. If the thermal characteristics of the one diode and the source transistor's base-emitter junction are matched, then the loop current is established by the voltage on the other diode and the emitter resistor. Since the voltage drop across the second diode varies with temperature, however, this loop current detector is temperature dependent. Also, the maximum loop length for which this circuit will operate is limited since the regulating transistor's collector must be operated out of saturation in order to provide the requisite base current in the first named resistor for turning on the control transistor. An object of this invention is the provision of an improved loop current detector.

SUMMARY OF INVENTION

In accordance with this invention, apparatus for detecting loop current in a closed path including a DC voltage source, loop resistance, and switch means that is selectively closed for passing a loop current in the path, comprises: a current sensing resistor in series in the path with one terminal thereof electrically connected to one terminal of the voltage source and the other terminal thereof electrically connected to a first node; means for providing a reference voltage of a prescribed value on a second node; a voltage controlled variable impedence means in series in the path and having a first control terminal; differential amplifier means having second and third control terminals electrically connected to the first and second nodes and having a first power terminal electrically connected to the first control terminal for presenting a feedback circuit for the differential amplifier means through the loop when the switch means is closed; and control means responsive to the difference between the voltages at the first and second nodes for operating in one of first and second states; the control means normally operating in the first state when the switch means is open; the control means being responsive to a change in the difference in voltages on the nodes of a prescribed amount for operating in the second state for indicating that the switch means is closed and that loop current is flowing in the path; the differential amplifier means being responsive to a voltage on the first node that is greater than the voltage on the second node for varying the voltage on the first power terminal for biasing the variable impedance means to adjust the impedance thereof to set the loop current to a prescribed value for paths in which the loop resistance is less than a limiting value.

And in an alternate embodiment, apparatus for detecting loop current in a closed path including a DC voltage source, loop resistance, and switch means that is selectively closed for passing a loop current in the path, comprises: a current sensing resistor in series in the path with one terminal thereof electrically connected to one terminal of the voltage source and the other terminal thereof electrically connected to a first node; a control transistor having one of its base and emitter electrodes electrically connected to the first node, and having a collector electrode electrically connected to the voltage source; first means for providing a reference voltage of a prescribed value at a second node and operable for decreasing the value of reference voltage from the prescribed value when current is bled away from the second node; second means for connecting the other one of the control transistors base and emitter electrodes to the second node, the reference voltage causing the control transistor to be normally conducting when the switch means is open; a first resistor and diode means electrically connected in series between the first and second nodes, the diode means being normally conducting when the switch means is open for passing current away from the second node for decreasing the magnitude of the reference voltage from the prescribed value for prebiasing said control transistor in the direction of non-conduction; the control transistor being responsive to a change in voltage on at least one of the nodes that is caused by current in the loop when the switch means is closed for changing the level of conduction of the former; and third means responsive to a change in the conduction rate of the control transistor for indicating that loop current is flowing in the path.

DESCRIPTION OF DRAWING

This invention will be more fully understood from the following detailed description of preferred embodiments thereof, together with the single FIGURE of drawing which is a schematic circuit and block diagram of a portion of a carrier subscriber telephone station terminal embodying this invention.

DESCRIPTION OF PREFERRED EMBODIMENTS

The carrier subscriber telephone station terminal in the FIGURE is powered by a local battery having terminals thereof designated −V and +V here. The battery may be charged with line current on a cable pair 12 from a central office battery, although this is not an essential requirement of this invention. The subscriber station terminal here is conventional and is only generally illustrated in the FIGURE. The station terminal is associated with a subscriber telephone 14 including a hook switch 15. The station terminal comprises a hybrid transformer 24; a loop current detector 28; transmit oscillator 30; modulator 32; and transmit filter 36. The center-tapped primary winding of the hybrid couples output and input signals to and from the cable pair 12. One terminals of the secondary windings W2 and W3 are connected to the tip and ring lines 16 & 18, respectively. The other terminal of W2 is connected through line 20 and a variable impedance element 42 (comprising a field effect transistor (FET) Q12, bypass capacitor C2, and bias resistor R5) to the positive terminal of the battery. The other terminal of W3 is connected through line 22 and a current sensing resistor Rs to the negative terminal of the battery. The other terminals of the secondary windings are also electrically connected together through AC coupling capacitor C1. The path from the negative terminal −V of the battery through Rs, W3, ring line 18, hook switch 15, tip line 16, the resistance of the drop wires (represented by R6), W2, line 20, and the primary conduction path of FET Q12 to the positive terminal of the local battery is referred to as the local subscriber loop. The impedance of this local loop is a function of the type of subscriber telephone set that is connected across the tip and ring lines 16 and 18 and the length of the latter.

When the handset of telephone 14 is on-hook such that the hook switch 15 is open, the loop current detector 28 is responsive to the absence of loop current in Rs for cutting off Q13, which disables the transmit oscillator 30 so that a 28 KHz tone is absent from the output line 31 thereof. When the handset goes off-hook for closing the hook switch 15, the circuit 28 detects current in the local subscriber loop by turning on Q13 and activating the oscillator 30. The oscillator then produces a 28 KHz tone on line 31 which is amplified, filtered and transmitted on cable pair 12 to the central office for indicating an off-hook condition of the carrier subscriber's handset.

In accordance with one aspect of this invention, the primary conduction path of the FET Q12 and a current-sensing resistor Rs are connected in series in the loop, with one terminals of the FET and Rs connected to opposite terminals of the battery. The FET is responsive to a voltage on line 43 for varying the resistance thereof in series in the loop for controlling the magnitude of loop current as is described more fully hereinafter. The other terminal of Rs is connected to a temperature compensated loop current detector 28 which may be readily fabricated in integrated circuit form.

The detector 28 comprises a source 44 producing a temperature-independent load-dependent reference voltage at node A, a differential amplifier 52, a control transistor Q10, and a circuit 62 for prebiasing the base emitter junction diode of Q10 in the direction of cutoff, as is described more fully hereinafter. The Q10 collector electrode is electrically connected through base bias resistor R7 of oscillator 30 to +V. This transistor Q10 conducts and cuts off Q13 for disabling the transmit oscillator 30 when the handset is on-hook.

The reference voltage source 44 comprises a pair of resistors R1 and R2 that are connected in series with a string of diode-connected transistors Q1–Q6. The resistors R1 and R2 form a voltage divider and are located on opposite sides of the node A at which the reference voltage is developed. In an embodiment fabricated with silicon transistors, the variation with temperatue of the voltage drop across each diode varies at the rate of −2.2 mV/°C. Equating the voltage drops in the series strings between nodes A and C and between nodes A and B and transposing one of them gives a temperature independent voltage at node A of as is shown by the expression $$\frac{+11R2}{R1+R2} - \frac{2.2R1}{R1+R2} = 0 \text{ mV/°C}. \tag{1}$$

where R1=5R and R2=R. Thus, the source 44 produces a temperature stabilized voltage at node A. When no current is drained away from the node A by diode Q11, the reference voltage is a prescribed value. When current is drained from the node A by conduction of Q11, the voltage at node A decreases as is described more fully hereinafter. In an embodiment of this invention that was operated with a 6 volt local local battery, the resistances of R1 and R2 were selected to be 36K ohms and 7.2K ohms for providing a prescribed reference voltage of 1 volt at node A. Conduction of Q11 caused this voltage to drop to approximately 0.7 volt.

The difference amplifier 52 comprises a pair of transistors Q8 and Q9 having their collector electrodes electrically connected to +V, with the Q9 collector also connected to the gate of the FET; having their emitter electrodes connected through Q7 to −V; and having their base electrodes connected to the nodes A and B, respectively. The emitter and collector may be designated power terminals and the base electrodes as control terminals. The diode Q6 is connected across the base emitter junction diode of Q7 for establishing the bias current in and the conduction rate of the differential amplifier pair Q8–Q9. The nodes A and B are also electrically connected to the base and emitter electrodes of the control transistor Q10. And in a preferred embodiment of this invention, the circuit 62 comprises the series connected resistor R4 and diode means Q11 between the base electrodes of Q8 and Q9 for prebiasing Q10 in the direction of cutoff. The transistors Q10 and Q11 are preferably matched so that they have the same thermal characteristics.

When the handset is on-hook so that there is no current flowing in the local subscriber loop, the diode string Q1–Q6 conducts for impressing a reference voltage such as 1 volt on node A which causes Q7 and Q8 to conduct, the control transistor Q10 to conduct lightly through R7 and Rs for cutting off Q13 and the transmitter, and Q11 to conduct lightly through R4 and Rs. This causes a very small current in the current sensing resistor Rs which ties node B to approximately $-V$ for cutting off Q9. This reduces the bias on the FET for causing the resistance of the FET, that is in series in the loop, to be a minimum value.

It will be noted that conduction of Q11 bypasses current away from node A. This causes the reference voltage there to decrease to approximately 0.7 volt. The resistance of R4 is selected to make the base emitter junction voltage for Q11 less than that of Q10 for prebiasing the control transistor Q10 in the direction of cut off. In an embodiment of the invention that was built and successfully operated, the resistances were R2=7.2K ohms and R4=900 ohms for making the Q11 base emitter voltage approximately 0.6 volts which biases Q10 in the direction of cut off. Stated differently, the difference between the voltages at nodes A and B must change only 0.1 volt to cut off Q1 and to change by even less to decrease the Q10 collector current sufficiently to lower the bias voltage on R7 enough to make Q13 conduct and turn on the transmitter for indicating the loop current is flowing and that the handset of telephone 14 is off-hook. It will be noted, however, that R2 and R4 are connected in different paths between node A and $-V$. This causes the node A voltage VA to increase along with the node B voltage VB, although not necessarily at the same rate. In accordance with this invention, the resistances of R2 and R4 are emperically selected to cause the voltage at node B to rise more rapidly than the voltage on node A.

The operation of the carrier subscriber equipment in the FIGURE will be described first with the diode Q11 absent from the loop current detector circuit 28. When the subscriber handset goes off-hook on a short drop circuit having a low loop resistance R6, loop current in Rs increases for making the node B voltage increase, with the node A voltage at approximately 1 volt. When the difference voltage VA−VB is approximately 0.6 volts, the collector current in Q10 is reduced sufficiently to turn on Q13 and the transmit oscillator. A further increase in VB cuts off Q10 and eventually turns on Q9 for decreasing the collector voltage on line 43. This reduces the channel width of the FET for causing the resistance of the FET to increase. This decreases the loop current in Rs to a predetermined value when VB=VA. As the resistance of R6 increases for longer loops, the FET resistance required for establishing the prescribed loop current in Rs decreases until the FET resistance is a minimum value. For longer loops, an increase in the loop resistance and value of R6 causes a corresponding decrease in the loop current, which falls below the predetermined value thereof. The circuit continues to detect an off-hook condition of the subscriber telephone 14 by turning on Q13, however, up to a maximum loop resistance $R6_{max}$ for which the conduction rate of Q10 does not decrease sufficiently to turn on Q13.

The operation of the loop current detector 28 will now be considered with R4 and Q11 connected between nodes A and B as is shown in the FIGURE. As indicated previously, Q10 and Q11 are conducting lightly with the subscriber handset on-hook for lowering Va to approximately 0.7 volt. When the subscriber handset goes off-hook on a short drop circuit, the resultant loop current causes VB to increase. Since Q11 is conducting now, however, this also causes VA to increase. By way of example, a 0.05 volt increase in VB from approximately 0.03 to 0.08 volt increases VA from 0.70 to 0.73 volt. Similarly, an increase in VB to 0.13 volt increases VA to approximately 0.75 volt. The difference voltage VA−VB is now 0.62 volt which decreases the collector current in R7 sufficiently to enable Q13 to conduct and turn on the transmitter for indicating an off-hook condition of the handset. A further increase in loop current and the voltage VB to 0.33 volt increases VA to approximately 0.83 volt. Since the difference voltage VA−VB is now only 0.5 volt, Q10 is cut off. The diode Q11 continues to conduct, however, until this difference voltage is approximately 0.4 volt. The voltages at nodes A and B continue to increase with loop current in Rs. When the difference voltage VA−VB is approximately 0.4 volt, Q11 is turned off for again establishing VA at 1 volt.

When the node B voltage exceeds 1 volt, Q9 conducts for causing the collector voltage thereof to reduce the channel width of Q12 for increasing the resistance of the FET which makes the loop current equal to the predetermined value when VB=VA. The circuit 28 including diode Q11 also maintains the loop current equal to the predetermined value for loop resistance which keeps the FET resistance less than the minimum value thereof. Since Q11 decreases or lowers the voltage and loop current for which an off-hook condition is detected, however, the circuit 28 and Q11 detect an off-hook condition of the subscriber telephone 14 by turning on Q13 for longer loops, up to a maximum loop resistance $R6_{max}'>R6_{max}$, although the loop current is less than the predetermined value. Thus, it is seen that R4 and Q11 operate for extending the length of a drop circuit for which the detector 28 will operate for detecting an off-hook condition of the subscriber telephone 14.

Although this invention is described in relation to preferred embodiments thereof, variations and modifications will occur to those skilled in the art without departing from the scope and intent of this invention. By way of example, the circuit may be implemented fully or partly with discrete components and with PNP transistors. Also, the circuit may be implemented with other than bipolar integrated circuit technologies. Additionally, Q7, Q8, Q9 and the FET may be omitted in an application where there is no requirement for providing a loop current of a predetermined value for short drop circuits. Further, a 1.4 volt zener diode may be connected across Rs for limiting the maximum voltage at node B when Q7, Q8, Q9 and Q12 are not used. Also, the circuit may be fabricated with germanium transistors rather than silicon transistors as was indicated for the example here. Further, Q10 may be driven into cut-off for turning on the transmit oscillator. The scope of this invention is therefore to be determined from the appended claims rather than from the aforementioned detailed descriptions.

What is claimed is:

1. Apparatus for detecting loop current in a closed path including a DC voltage source, loop resistance, and switch means that is selectively closed for passing a loop current in the path, comprising;
   a current sensing resistor in series in the path with one terminal thereof electrically connected to one terminal of the voltage source and the other terminal thereof electrically connected to a first node;

a control transistor having one of its base and emitter electrodes electrically connected to said first node, and having a collector electrode electrically connected to the voltage source;

first means for providing a reference voltage of a prescribed value at a second node and operable for decreasing the value of reference voltage from the prescribed value when current is bled away from said second node;

second means for connecting the other one of said control transistor's base and emitter electrodes to said second node, said reference voltage causing said control transistor to be normally conducting when the switch means is open;

a first resistor and diode means electrically connected in series between said first and second nodes, said diode means being normally conducting when the switch means is open for passing current away from said second node for decreasing the magnitude of the reference voltage from the prescribed value for prebiasing said control transistor in the direction of non-conduction;

said control transistor being responsive to a change in voltage on at least one of said nodes that is caused by current in the loop when the switch means is closed for changing the level of conduction of said control transistor; and third means responsive to a change in the conduction rate of said control transistor for indicating that loop current is flowing in the path.

2. Apparatus according to claim 1 wherein said control transistor is operative for decreasing the level of conduction thereof in response to loop current in the sensing resistor when the switch means is closed.

3. Apparatus according to claim 2 wherein the voltage drop across said diode means is maintained less than the base emitter junction voltage drop of said control transistor for prebiasing said control transistor in the direction of cut-off.

4. Apparatus according to claim 3 wherein said first resistor and said reference voltage means cause the voltages at said first and second nodes to increase at different rates in response to an increase in loop current in said current sensing resistor.

5. Apparatus according to claim 4 wherein said first resistor and reference voltage means cause the voltage at said first node to increase more rapidly than the voltage at said second node for changing the conduction rate of said control transistor.

6. Apparatus according to claim 5 wherein the resistance of said first resistor is selected for establishing the voltage drop across said diode means and thus the level of prebiasing of said control transistor.

7. Apparatus according to claim 5 wherein said reference voltage means comprises voltage divider means electrically connected to opposite terminals of the voltage source and comprising second and third series connected resistors on opposite sides of a tap point that is electrically connected to said second node.

8. Apparatus according to claim 7 wherein said reference voltage means provides a temperature stabilized reference voltage at said second node.

9. Apparatus for detecting current in a local loop in a carrier telephone subscriber station terminal including a carrier frequency transmit oscillator which is to be energized for transmitting an off-hook carrier signal to a central office terminal when the handset of the subscriber's telephone instrument goes off-hook for closing the hook switch thereof and wherein the loop comprises a local battery voltage source, the hook switch, and the loop resistance, said apparatus comprising:

a current sensing resistor in series in the loop with one terminal thereof electrically connected to one terminal of the voltage source and the other terminal thereof electrically connected to a first node;

means for providing a reference voltage of a prescribed value at a second node and operable for decreasing the value of reference voltage from the prescribed value when current is bled away from said second node;

a first resistor and diode means electrically connected in series between said first and second nodes, said diode means being normally conducting when the hook switch is open for passing current away from said second node for decreasing the magnitude of reference voltage from the prescribed value;

control means responsive to the difference between the voltages at said first and second nodes for operating in one of first and second states; said control means normally operating in the first state when the hook switch is open for de-energizing the transmit oscillator and being responsive to a voltage representation of current in the loop when the hook switch is closed for changing to operate in the second state for energizing the transmit oscillator to indicate that loop current is flowing in the path.

10. Apparatus according to claim 9 wherein said control means comprises a control transistor that is normally conducting in an on-hook condition and having one and other of its base and emitter electrodes electrically connected to said first and second nodes and having its collector electrode electrically connected to the voltage source; conduction of said diode means during an on-hook condition of the hook switch prebiasing said control transistor in the direction of non-conduction.

11. Apparatus according to claim 10 wherein the voltage drop across said diode means is maintained less than the base emitter junction voltage of said control transistor for prebiasing said control transistor in the direction of cut-off.

12. Apparatus according to claim 11 wherein said first resistor and reference voltage means cause the voltage at said first node to increase more rapidly than the voltage at said second node in response to an increase in loop current for changing the conduction rate of said control transistor.

13. Apparatus according to claim 12 wherein said reference voltage means comprises voltage divider means electrically connected to opposite terminals of the voltage source and comprising second and third series connected resistors on opposite sides of a tap point that is electrically connected to said second node.

14. Apparatus according to claim 13 wherein said reference voltage means provides a temperature stabilized reference voltage at said second node.

15. Apparatus for detecting loop current in a closed path including a DC voltage source, loop resistance, and switch means that is selectively closed for passing a loop current in the path, comprising;

a current sensing resistor in series in the path with one terminal thereof electrically connected to one terminal of the voltage source and the other terminal thereof electrically connected to a first node;

means for providing a reference voltage of a prescribed value on a second node;

a voltage controlled variable impedance means in series in the path and having a first control terminal;

differential amplifier means having second and third control terminals electrically connected to said first and second nodes and having a first power terminal electrically connected to said first control terminal for presenting a feedback circuit for said differential amplifier means through the loop when the switch means is closed; and control means responsive to the difference between the voltages at said first and second nodes for operating in one of first and second states; said control means normally operating in the first state when the switch means is open; said control means being responsive to a change in the difference in voltages on said nodes of a prescribed amount for operating in the second state for indicating that the switch means is closed and that loop current is flowing in the path;

said differential amplifier means being responsive to a voltage on said first node that is greater than the voltage on said second node for varying the voltage on said first power terminal for biasing said variable impedance means to adjust the impedance thereof to set the loop current to a prescribed value for paths in which the loop resistance is less than a limiting value.

16. Apparatus according to claim 15 wherein said differential amplifier means has second and third power terminals and comprising means for electrically connecting each of said first, second and third power terminals to a terminal of the voltage source.

17. Apparatus according to claim 16 wherein said control means comprises a control transistor that is normally conducting in an on-hook condition and having one and other of its base and emitter electrodes electrically connected to said first and second nodes and having its collector electrode electrically connected to the voltage source.

18. Apparatus according to claim 17 comprising a voltage breakdown means electrically connected between the other terminal of said current sensing resistor and the one terminal of the voltage source for limiting the difference voltage presented across said control transistor's base-emitter junction diode.

19. Apparatus according to claim 17 wherein said reference voltage means provides a temperature stabilized reference voltage at said second node.

20. Apparatus according to claim 17 wherein said reference voltage means is load dependent and operable for decreasing the value of reference voltage from the prescribed value when current is bled away from said second node; and comprising a first resistor and diode means electrically connected in series between said first and second nodes, said diode means being normally conducting when the switch means is open for passing current away from said second node for decreasing the magnitude of the reference voltage from the prescribed value for prebiasing said control transistor in the direction of non-conduction.

21. Apparatus according to claim 20 wherein the voltage drop across said diode means is maintained less than the base emitter junction diode voltage drop of said control transistor for prebiasing said control transistor in the direction of cut-off.

22. Apparatus according to claim 21 wherein said first resistor and reference voltage means cause the voltage at said first node to increase more rapidly than the voltage at said second node in response to increasing loop current for changing the conduction rate of said control transistor.

23. Apparatus according to claim 22 wherein said reference voltage means comprises voltage divider means electrically connected to opposite terminals of the voltage source and comprising second and third series connected resistors on opposite sides of a tap point that is electrically connected to said second node.

24. Apparatus according to claim 23 wherein said reference voltage means provides a temperature stabilized reference voltage at said first node.

25. Apparatus according to claim 24 wherein said differential amplifier means comprises first and second transistors having base electrodes electrically connected to said first and second control terminals, respectively; having collector electrodes electrically connected to said first and second power terminals, respectively, and to the other terminal of the voltage source; and having emitter electrodes electrically connected to said third power terminal and to the one terminal of the voltage source.

26. In a carrier telephone subscriber station terminal including a carrier frequency transmit oscillator which is energized for transmitting a carrier signal to a central office terminal when the handset of the subscriber's telephone instrument goes off-hook for closing the hook switch thereof in a local loop comprising the hook switch, the loop resistance, and a local battery voltage source, the method of detecting current in the local loop that indicates an off-hook condition of the telephone handset comprising the steps of:

sensing loop current with a current sensing resistor in series in the loop;

comparing a reference voltage with voltage developed across the current sensing resistor by loop current;

operating the transmit oscillator for indicating an off-hook condition of the handset when the difference between the voltage on the current sensing resistor and the reference voltage changes a prescribed amount; and varying a resistance, other than the value of the current sensing resistor, in the loop for making the loop current a predetermined value for an off-hook condition on a loop of limited length.

27. The method according to claim 26 wherein said operating step comprises causing a control transistor to change the rate of conduction thereof a prescribed amount for turning on the transmit oscillator.

28. The method according to claim 27 wherein the control transistor has a base emitter junction and the reference voltage is load dependent, and comprising the additional step of prebiasing the base emitter junction of the control transistor in the direction of cut-off.

* * * * *